United States Patent
Albenge et al.

(10) Patent No.: US 12,247,131 B2
(45) Date of Patent: *Mar. 11, 2025

(54) PROCESS OF PREPARATION OF AN AQUEOUS GEL INK WITH FIXED COLOR COMPRISING SILVER NANOPARTICLES

(71) Applicants: SOCIETE BIC, Clichy (FR); UNIVERSITE DE HAUTE ALSACE, Mulhouse (FR); CENTRE NATIONAL DE LA RECHERCHE SCIENTIFIQUE, Paris (FR)

(72) Inventors: Olivier Albenge, Clichy (FR); Romain Metillon, Clichy (FR); Karine Mougin, Paris (FR); Feriel Ghellal, Clichy (FR); Arnaud Spangenberg, Mulhouse (FR)

(73) Assignees: SOCIETE BIC, Clichy (FR); UNIVERSITÉ DE HAUTE-ALSACE, Clichy (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 591 days.

This patent is subject to a terminal disclaimer.

(21) Appl. No.: 17/630,805

(22) PCT Filed: Aug. 28, 2020

(86) PCT No.: PCT/EP2020/074154
§ 371 (c)(1),
(2) Date: Jan. 27, 2022

(87) PCT Pub. No.: WO2021/038085
PCT Pub. Date: Mar. 4, 2021

(65) Prior Publication Data
US 2022/0275225 A1    Sep. 1, 2022

(30) Foreign Application Priority Data
Aug. 29, 2019    (EP) .................... 19306049

(51) Int. Cl.
*C09D 11/17*    (2014.01)
*B82Y 30/00*    (2011.01)

(52) U.S. Cl.
CPC .............. *C09D 11/17* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 6,390,710 B1 * | 5/2002 | Miyamoto | ............. C09D 11/18 401/209 |
| 9,556,350 B2 | 1/2017 | De La Vega et al. | |
| 2012/0283336 A1 | 11/2012 | Grigorenko et al. | |

FOREIGN PATENT DOCUMENTS

| | | |
|---|---|---|
| CN | 101128550 A | 2/2008 |
| CN | 102702840 A | 10/2012 |
| CN | 103200825 A | 7/2013 |
| CN | 106867315 A | 6/2017 |
| CN | 107022241 A | 8/2017 |
| CN | 108530994 A | 9/2018 |
| JP | 2008297323 A | 12/2008 |
| KR | 101020150 B1 | 3/2011 |
| WO | 2006132643 A2 | 12/2006 |
| WO | 2012059943 A2 | 5/2012 |

OTHER PUBLICATIONS

International Search Report and Written Opinion in International Application No. PCT/EP2020/074154, mailed Nov. 19, 2020 (7 pages).
First Search issued in corresponding Chinese Application No. 202080049931.4, mailed Jan. 3, 2023.

* cited by examiner

*Primary Examiner* — Robert T Butcher
(74) *Attorney, Agent, or Firm* — Bookoff McAndrews, PLLC

(57) ABSTRACT

The present invention concerns a process for preparing an aqueous gel ink with fixed color comprising the following steps: (i) preparing a gel-based matrix of aqueous ink; (ii) preparing an aqueous suspension of silver nanoparticles with a fixed color by mixing silver salts with: —water, —a mixture of at least an alkali metal or alkaline earth metal salt of citrate, —an oxidizing agent, preferably hydrogen peroxide $H_2O_2$, —and polyvinylpyrrolidone; (iii) adding under agitation the aqueous suspension of silver nanoparticles obtained in step (ii) to the gel-based matrix of aqueous ink obtained in step (i), to obtain an aqueous gel ink with fixed color with silver nanoparticles dispersed therein.

19 Claims, No Drawings

PROCESS OF PREPARATION OF AN AQUEOUS GEL INK WITH FIXED COLOR COMPRISING SILVER NANOPARTICLES

CROSS-REFERENCE TO RELATED APPLICATIONS

This application is the U.S. national phase entry under 35 U.S.C. § 371 of International Application No. PCT/EP2020/074154, filed Aug. 28, 2020, which claims priority to European Patent Application No. 19306049.8, filed Aug. 29, 2019, the entire contents of which are incorporated herein by reference.

The present invention concerns a process for preparing an aqueous gel ink with fixed color, and to aqueous gel inks with fixed color comprising silver nanoparticles stabilized by polyvinylpyrrolidone, obtainable according to the process of the invention, and free from any dye and pigment. The invention also concerns a writing instrument comprising an aqueous gel ink with fixed color according to the invention.

One of the main objectives of the present invention is to replace all type of dyes and pigments normally present in aqueous gel inks, which have the disadvantage of being expensive and causing high production costs.

Another objective of the present invention is to replace all types of dyes and pigments normally present in aqueous gel inks, which have the disadvantage of being irritating to biological membranes, for example skin and eyes, and may cause allergies.

The inventors have surprisingly found that the new aqueous inks containing nanoparticles-based are also resistant to UV light thereby improving light stability over time.

Moreover silver nanoparticles have antibacterial properties and therefore the amount of other antibacterial agents can be lowered.

To this end, the inventors have developed a specific process through which it is possible to obtain new aqueous inks with fixed color when writing by replacing former aqueous inks containing dyes and pigments by new ones that are nanoparticles-based. The process developed within the framework of the invention also presents the advantage of being performed in aqueous media, and therefore to be a "green process". In addition, the process of the invention is performed at low temperature ranges, works in an ecologically viable manner, and also takes account of ecological requirements.

The present invention relates to a process for preparing an aqueous gel ink with fixed color comprising the following steps:
(i) preparing a gel-based matrix of aqueous ink;
(ii) preparing an aqueous suspension of silver nanoparticles with a fixed color by mixing silver salts with:
   water,
   a mixture of at least an alkali metal or alkaline earth metal salt of citrate, preferably an alkali citrate salt and an alkali metal hydride, preferably $NaBH_4$,
   an oxidizing agent, preferably hydrogen peroxide $H_2O_2$,
   and polyvinylpyrrolidone;
(iii) adding under agitation the aqueous suspension of silver nanoparticles obtained in step (ii) to the gel-based matrix of aqueous ink obtained in step (i), to obtain an aqueous gel ink with fixed color with silver nanoparticles dispersed therein.

The present invention also relates to a process for preparing an aqueous ink wherein preparing a matrix of aqueous ink in step (i). The present invention also relates to an aqueous ink that is obtainable through such process. The various embodiments described hereafter regarding the process of preparation of an aqueous gel ink and regarding the aqueous gel ink that can be obtained through this process can be as well considered for the process of preparation of the aqueous ink and for the aqueous ink thus obtained, in particular regarding the nature and/or content of the components. These embodiments regarding the aqueous ink, its process of preparation and the matrix of aqueous ink are also part of the present invention.

According to a preferred embodiment of the invention, the process for preparing an aqueous gel ink with fixed color comprises the following steps:
(i) preparing a gel-based matrix of aqueous ink;
(ii) preparing an aqueous suspension of silver nanoparticles with a fixed color by mixing silver salts with:
   water,
   a mixture of at least sodium citrate and sodium borohydride $NaBH_4$,
   hydrogen peroxide $H_2O_2$,
   and polyvinylpyrrolidone;
(iii) adding under agitation the aqueous suspension of silver nanoparticles obtained in step (ii) to the gel-based matrix of aqueous ink obtained in step (i), to obtain an aqueous gel ink with fixed color with silver nanoparticles dispersed therein.

The process according to the invention enables to obtain an aqueous ink composition which exhibits a plasmon effect (also called plasmonic effect). Hence, different plasmonic color of the composition can be obtained depending on the content of the components used.

For the purposes of the present invention, the term "ink" is intended to mean a "writing ink" which is intended to be used in a writing instrument, and in particular in a pen. A writing ink should not be confused with a "printing ink" which is used in printing machines and which does not have the same technical constraints and thus the same specifications. Indeed, a writing ink must not contain solid particles of which the size is greater than the channels of the writing instrument, in order to avoid blocking them, which would inevitably lead to writing being irreversibly stopped. In addition, it must allow an ink flow rate suitable for the writing instrument used, in particular a flow rate of between 100 and 500 mg/200 m of writing, and specifically between 150 and 400 mg/200 m of writing. It must also dry sufficiently rapidly to avoid smudging the writing medium. It must also avoid the problems of migration (bleeding) over time. Thus, the ink according to the present invention will be suitable for the writing instrument for which it is intended, in particular for a pen.

In addition, a "writing ink" must not be too fluid, so as to avoid leaks during writing. However, it must be sufficiently fluid to facilitate the flow of the writing action.

In the particular case of the invention, the writing ink can be more specifically a "gel ink" (which corresponds therefore to a thixotropic ink), in particular viscosity measured at rest (at a shear rate of $0.01$ $s^{-1}$) at $20°$ C. is different and in particular higher than the viscosity measured with a shear rate of $100$ $s^{-1}$ at $20°$ C. using the same rheometer such as a cone-and-plate rheometer for example Malvern KINEXUS with a cone of 60 mm and an angle of $1°$. In a particular embodiment, the viscosity of the gel ink measured under these conditions ranges from 1,000 to 7,000 mPa·s, specifically from 2,000 to 5,000 mPa·s, and more specifically from 2,500 to 3,500 mPa·s, with a shear rate of $1$ $s^{-1}$, and specifically from 5 to 50 mPa·s, more specifically from 7 to 40 mPa·s, and still more specifically from 10 to 20 mPa·s with a shear rate of 5,000 s$^{-1}$. Specifically, such a viscosity is stable during storage for at least three months at 40° C. and 20% relative humidity, in particular the viscosity will not have a more than 50% decrease. More specifically, the return to viscosity at rest after shear is very quick, specifically at most a few minutes, in order to avoid the static leakage in the minutes after writing.

In the sense of the invention, the term "fixed color" is intended to mean that the color of the aqueous gel ink by visual observation is the same before application on absorbing support, and after application on absorbing support, specifically paper, carboard or textiles, within 7 calendar days (one week).

In particular depending on the content of some components, in particular the content of sodium borohydride (NaBH$_4$) and/or sodium citrate and/or polyvinylpyrrolidone added during the process of preparation of aqueous ink, the color of the composition will vary due to plasmonic effect, in particular the color of the composition can change depending on the light absorption by silver nanoparticles and the space between them into the ink composition.

In fact, the plasmonic color is due to the light absorption by silver nanoparticles and/or to the spacing between them in the material. Depending on their size, shape, and distance, the color of the dispersion of the nanoparticles can change, as well as its properties. This is due to the plasmon resonance. The exposure of the silver nanoparticles to a certain frequency of waves brings the electrons to gather in a certain place, which changes in accordance with the size and shape of the silver nanoparticles. This agglomeration of electrons provokes an anisotropy of the nanoparticles, which will then lead to a change of light absorption and scattering, resulting in a specific color. Plasmon resonance is also affected by the distance between the silver nanoparticles due to the coupling of said silver nanoparticles. Indeed, the closer the silver nanoparticles are, the more they will interact with each other, which will increase their coupling effect also called plasmon effect. In the same way, the shape influences the plasmon resonance. In particular, such plasmonic effect can be characterized by UV (ultraviolet)-visible-NIR (near infrared) absorption spectroscopy The present invention also concerns an aqueous ink with fixed color obtainable by the process of the invention, said aqueous ink comprising silver nanoparticles and polyvinylpyrrolidone.

In the present invention, the gel-based matrix of aqueous ink prepared in step (i) may comprise from 50 to 95%, specifically from 60 to 90%, and more specifically from 70 to 85%, by weight of water.

The gel-based matrix of aqueous ink prepared in step (i) may also comprise classic gel ink ingredients such as co-solvents, antimicrobial agents, corrosion inhibitors, antifoam agents, rheology modifiers, etc. The gel ink ingredients used to prepare the gel-based matrix of aqueous ink of step (i) will be largely described below, in relation with the subject-matter of the aqueous gel ink with fixed color of the invention.

The gel-based matrix of aqueous ink is prepared by methods well known by the one skilled in the art such as by simple mixing of its ingredients.

In a specific embodiment, the gel-based matrix of aqueous ink does not contain any coloring agent. Therefore it does not contain any dyes or pigments. In this case, the gel-based matrix of aqueous ink is transparent.

In another specific embodiment, the gel-based matrix of aqueous ink does not contain any reducing agent or any oxidizing agent.

In the present invention, the silver salts are specifically silver(I) salts such as AgNO$_3$, AgClO$_4$, Ag$_2$SO$_4$, AgCl, AgBr, AgOH, Ag$_2$O, AgBF$_4$, AgIO$_3$, AgPF$_6$ and mixture thereof, more specifically it is nitrate silver AgNO$_3$. In particular the silver salts are in the form of a solution of silver nitrate in water.

In a specific embodiment, the total amount of silver salts added in step (ii) ranges from 0.0005 to 0.006 weight %, specifically from 0.001 to 0.005 weight %, based on the total weight of the aqueous suspension.

Silver nanoparticles are formed when contacting the silver salts with the reducing agents and the oxidizing agent.

In the present invention, a mixture of at least an alkali metal or alkaline earth metal salt of citrate, preferably an alkali citrate salt and an alkali metal hydride, preferably NaBH$_4$ are responsible for the color in step (ii).

In the present invention, the alkali metals of citrate are chosen among lithium citrate, sodium citrate, potassium citrate, rubidium citrate, caesium citrate and francium citrate, preferably sodium citrate or potassium citrate, more preferably sodium citrate.

In a specific embodiment of this invention, the alkali metal salt of citrate is sodium citrate.

In the present invention, the alkali earth metal salts of citrate are chosen among beryllium citrate, magnesium citrate, calcium citrate, strontium citrate, barium citrate and radium citrate, preferably magnesium citrate or calcium citrate, more preferably calcium citrate.

In a specific embodiment of this invention, the alkali earth metal salt is calcium citrate.

In the present invention, the alkali metal hydride are chosen among sodium borohydride (NaBH$_4$), sodium cyanoborohydride (NaBH$_3$CN), sodium triacetoxy borohydride (NaHB(OAc)$_3$), sodium tri-sec-butylborohydride, potassium tri-sec-butylborohydride, potassium triethylborohydride, lithium triethylborohydride, lithium tri-sec-butylborohydride, nickel borohydride, lithium aluminate hydride, diisobutylaluminium hydride, sodium bis (2-methoxyethoxyaluminium hydride.

In a specific embodiment of this invention, the alkali metal hydride is sodium borohydride (NaBH$_4$).

According to a preferred embodiment of this invention, a mixture of sodium citrate and sodium borohydride (NaBH$_4$) are responsible for the coloring step (ii).

In particular, the proportion of an alkali metal hydride, preferably NaBH$_4$ enable to obtain a specific color in the composition, more specifically with different amount of alkali metal hydride, preferably NaBH$_4$. In particular, this is due to plasmonic effect exhibited by the composition. For example, the color can be change from red to pink to purple to blue with higher amount of alkali metal hydride, preferably NaBH$_4$.

In a specific embodiment, the amount of said citrate salts added in step (ii) ranges from 0.001 to 0.08 weight %, specifically from 0.002 to 0.005 weight %, based on the total weight of the aqueous suspension.

In a specific embodiment, the amount of alkali metal hydride added in step (ii) ranges from 0.0005 to 0.005 weight %, specifically from 0.0006 to 0.003 weight %, based on the total weight of the aqueous suspension.

The mechanism of formation of colloidal solution from the reduction of silver ions consists of two steps: nucleation and growth. The nucleation step required high activation energy while the growing step requires low activation energy.

According to a preferred embodiment of the invention, the process for preparing an aqueous suspension of silver nanoparticles with fixed color (ii) comprises an additional heating step, for example when adding said alkali metal hydride.

According to a preferred embodiment of the invention, the process for preparing an aqueous suspension of silver nanoparticles with fixed color (ii) comprises the following steps:
mixing initially silver salts with water and a mixture of at least an alkali metal or alkaline earth metal salt of citrate, preferably an alkali citrate salt and an alkali metal hydride such as $NaBH_4$ and oxidizing agent, preferably hydrogen peroxide $H_2O_2$, and polyvinylpyrrolidone (step: nucleation)
an optional heating step,
mixing the previous composition with silver salts and an alkali metal hydride, preferably $NaBH_4$ (step: growth).

In a specific embodiment, the molar ratio between the silver salts and the mixture of at least an alkali metal or alkaline earth metal salt of citrate, preferably an alkali citrate salt and an alkali metal hydride $NaBH_4$ ranges from 0.02:1 to 0.10:1, and preferably from 0.03:1 to 0.06:1.

According to this invention, the oxidizing agent is chosen among $C_1$-$C_8$ alkyl peroxyacids, e.g. peracetic acid, acetyl cyclohexane sulfonyl peroxide, diisopropyl peroxydicarbonate, tert-amyl perneodecanoate, tert-butyl perneodecanoate, tert-butyl perpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinic acid peroxide, diacetyl peroxide, dibenzoyl peroxide, tert-butyl per-2-ethylhexanoate, bis(4-chlorobenzoyl)-peroxide, tert-butyl perisobutyrate, tert-butyl permaleinate, 1,1-bis(tert-butyl peroxy)3,5,5-tri methylcyclohexane,1,1-bis(tert-butylperoxy) cyclohexane, tert-butyl peroxy isopropylcarbonate, tert-butyl perisononaoate, 2,5-di methylhexane 2,5-dibenzoate, tert-butyl peracetate, tert-amyl perbenzoate, tert-butyl perbenzoate, 2,2-bis(tert-butylperoxy)butane, 2,2 bis(tert-butylperoxy) propane, dicumyl peroxide, 2,5-dimethylhexane-2,5-di-tert-butyl peroxide, 3-tert-butylperoxy 3-phenyl phthalide, di-tert-amyl peroxide, α,α'-bis(tert-butyl peroxyisopropyl)benzene, 3,5-bis(t-butylperoxy)3,5-di methyl 1,2-dioxolane, di-tert-butylperoxide, 2,5-di methyl hexyne-2,5-di-tert-butyl peroxide and 3,3,6,6,9,9-hexamethyl-1,2,4,5-tetraoxacyclononane, hydrogen peroxide $H_2O_2$ and mixtures thereof.

Hydrogen peroxide ($H_2O_2$) may be considered a "green" reagent, in that the decomposition thereof ultimately leads to the formation of water and oxygen.

According to a preferred embodiment of this invention, the oxidizing agent is hydrogen peroxide $H_2O_2$.

In a specific embodiment, the amount of oxidizing agent added in step (ii) ranges from 0.03 to 0.1 weight %, specifically from 0.04 to 0.08 weight %, based on the total weight of the aqueous suspension.

The aqueous suspension of step (ii) also contains polyvinylpyrrolidone. Indeed it will stabilize the silver nanoparticles in the suspension, therefore avoiding any aggregation.

In a specific embodiment, the amount of polyvinylpyrrolidone added in step (ii) ranges from 0.05 to 0.1 weight %, specifically from 0.07 to 0.09 weight %, based on the total weight of the aqueous suspension.

The aqueous suspension of silver nanoparticles obtained in step (ii) has a fixed color. Its color depends on the proportion of an alkali metal hydride, preferably $NaBH_4$. For example, the color can change from red to pink to purple to blue with higher amount of alkali metal hydride, preferably $NaBH_4$ In a specific embodiment, the silver nanoparticles obtained in step (ii) have the shape of spheres.

Specifically, the silver nanoparticles of the invention have an average particle size ranging from 1 to 100 nm and more specifically from 10 to 50 nm. This average particle size is determined by analysis of 2D images (microscope: JEOL ARM 200), according to the standard ISO9001:2015.

In one aspect, the present invention also relates to a process for preparing an aqueous suspension of silver nanoparticles with fixed color according to step (ii) and to the aqueous suspension obtainable according to step (ii).

The present invention also concerns an aqueous gel ink with fixed color obtainable by the process of the invention, said aqueous gel ink comprising silver nanoparticles and polyvinylpyrrolidone, in particular, said aqueous ink comprises silver nanoparticles stabilized by polyvinylpyrrolidone.

In particular, the compositions according to the invention exhibits a plasmonic effect.

In a specific embodiment, the amount of polyvinylpyrrolidone ranges from 0.05 to 0.1 weight %, specifically from 0.05 to 0.08 weight %, based on the total weight of the aqueous gel ink with fixed color obtainable by the process of the invention.

In the aqueous gel ink with fixed color of the invention, the silver nanoparticles have specifically the shape of spheres.

In the aqueous gel ink with fixed color of the invention, the silver nanoparticles of the invention have specifically an average particle size ranging from 1 to 100 nm and more specifically from 10 to 50 nm. This average particle size is determined by analysis of 2D images (microscope: JEOL ARM 200), according to the standard ISO9001:2015.

According to a specific embodiment, the distance between the silver nanoparticles within the aqueous gel ink of the invention is lower than 100 nm, specifically varies from 10 to 50 nm and more specifically varies from 15 to 30 nm.

The fixed color of the aqueous gel ink of the invention will be the same as the fixed color of the aqueous suspension of silver nanoparticles obtained in step (ii). Therefore specifically the silver nanoparticles are the only coloring agent of the aqueous gel ink of the invention. In this case, the aqueous gel ink according to the invention does not contain any other coloring agent than the silver nanoparticles.

In the aqueous ink with fixed color of the invention, more specifically the aqueous gel ink, the amount of silver nanoparticles specifically ranges from 0.0005 to 5 weight % and more specifically from 0.0007 to 3 weight %, relative to the total weight of the aqueous ink.

In particular, in the aqueous gel ink with fixed color of the invention, the amount of silver nanoparticles specifically ranges from 0.0005 to 0.005 weight % and more specifically from 0.0007 to 0.002 weight %, relative to the total weight of the aqueous gel ink.

In the aqueous gel ink with fixed color of the invention, the amount of water specifically ranges from 50 to 95%, more specifically from 60 to 90%, and even more specifically from 70 to 85%, by weight relative to the total weight of the aqueous gel ink.

The aqueous ink with fixed color of the disclosure and the aqueous suspension obtainable in step (ii) comprise in particular alkali metal salt, more specifically sodium salts. Indeed, this composition shall be obtained by the above-described process, which uses at least an alkali metal hydride and may also uses an alkali metal salt of citrate. When the above-described process uses an alkaline earth metal salt of citrate, the resulting aqueous ink composition and the aqueous suspension obtainable in step (ii) comprise alkaline earth metal salt in addition to an alkali metal salt. In particular, the amount of alkali metal salt such as sodium salt, is of at least 0.0003 weight %, in particular ranges from 0.0003 to 0.01 weight % based on the total weight of the aqueous ink and/or based on the total weight of the aqueous suspension.

In particular, when present, the amount of alkaline earth metal is of at least 0.00009 weight %, more specifically ranges from 0.00009 to 0.007 weight % based on the total weight of the aqueous ink and/or based on the total weight of the aqueous suspension.

The aqueous gel ink with fixed color of the invention may also comprise classic gel ink ingredients such as co-solvents, antimicrobial agents, corrosion inhibitors, antifoam agents, rheology modifiers, as described below. These gel ink ingredients are added to the gel-based matrix of aqueous ink in step (i) of the process of the invention.

The aqueous gel ink of the invention may comprise a co-solvent. Among the co-solvents that can be used, mention may be made of polar solvents miscible in water such as:
- glycol ethers such as triethylene glycol, polyethylene glycol, diethylene glycol monoethyl ether, diethyleneglycol-mono butyl ether, dipropyleneglycol monobutyl ether, tripropylene glycol monomethyl ether, phenoxyethanol, phenoxypropanol,
- alcohols: linear or branched alcohol in $C_1$-$C_{15}$ such as isopropanol, butanol, isobutanol, pentanol, benzyl alcohol, glycerin, diglycerin, polyglycerin,
- esters such as ethyl acetate or propyl acetate,
- carbonate esters such as propylene carbonate or ethylene carbonate,
- ketones such as methylisobutylketone (MIBK), acetone or cyclohexanone, and
- mixtures thereof.

In a specific embodiment, the co-solvent is chosen in the group consisting of glycol ethers, and more specifically is chosen in the group consisting of triethylene glycol, polyethylene glycol, diethylene glycol monoethyl ether, diethylene-glycol-mono butyl ether, dipropyleneglycol monobutyl ether, tripropylene glycol monomethyl ether, phenoxyethanol, phenoxypropanol, and mixture thereof. In a further specific embodiment the co-solvent is chosen in the group consisting of triethylene glycol, polyethylene glycol and mixture thereof.

Specifically, the co-solvent is present in the aqueous gel ink of the invention in an amount ranging from 5 to 35%, more specifically from 9 to 30%, and even more specifically from 11 to 25%, by weight relative to the total weight of the aqueous gel ink.

The aqueous gel ink of the invention may comprise an antimicrobial agent such as isothiazolinone (ACTICIDE® from Thor), specifically chosen in the group consisting of 1,2-benzisothiazolin-3-one, 2-methyl-4-isothiazolin-3-one, and mixture thereof.

Specifically, the antimicrobial agent is present in the aqueous gel ink of the invention in an amount ranging from 0.01 to 0.5%, and more specifically from 0.1 to 0.2%, by weight relative to the total weight of the aqueous gel ink.

The aqueous gel ink of the invention may comprise a corrosion inhibitor, specifically chosen in the group consisting of tolytriazole, benzotriazole, and mixture thereof.

Specifically, the corrosion inhibitor is present in the aqueous gel ink of the invention in an amount ranging from 0.05 to 1%, more specifically from 0.07 to 0.5%, and even more specifically from 0.08 to 0.15%, by weight relative to the total weight of the aqueous gel ink.

The aqueous gel ink of the invention may comprise an antifoam agent, specifically a polysiloxane-based antifoam agent, and more specifically an aqueous emulsion of modified polysiloxane (such as MOUSSEX® from Synthron, TEGO® Foamex from Evonik).

Specifically, the antifoam agent is present in the aqueous gel ink of the invention in an amount ranging from 0.05 to 1%, more specifically from 0.1 to 0.5%, and even more specifically from 0.2 to 0.4%, by weight relative to the total weight of the aqueous gel ink.

The aqueous gel ink of the invention may comprise a rheology modifier capable of generating a gelling effect, in particular capable of generating a thixotropic phenomenon wherein the viscosity depends on the time of shear rate, for example chosen in the group consisting of polysaccharides such as xanthan gum, gum arabic, and mixture thereof.

Specifically, the rheology modifier is present in an amount ranging from 0.08 to 2%, more specifically from 0.2 to 0.8%, and even more specifically from 0.3 to 0.6%, by weight relative to the total weight of the aqueous gel ink.

The aqueous gel ink with fixed color of the invention may also comprise other additives such as:
- pH regulators like sodium hydroxide and triethanolamine,
- lubricants,
- coalescing agents,
- crosslinking agents,
- wetting agents,
- plasticizers,
- antioxidants, and
- UV stabilizers.

When present, these additives are added to the gel-based matrix of aqueous ink in step (i) of the process of the invention.

In one aspect, the invention relates to a process for preparing an aqueous ink with fixed color comprising the following steps:
(i) preparing a matrix of aqueous ink;
(ii) preparing an aqueous suspension of silver nanoparticles with a fixed color by mixing silver salts with:
water,
a mixture of at least an alkali metal or alkaline earth metal salt of citrate, preferably an alkali citrate salt and an alkali metal hydride, preferably NaBH4,
an oxidizing agent, preferably hydrogen peroxide H2O2, and polyvinylpyrrolidone;
(iii) adding under agitation the aqueous suspension of silver nanoparticles obtained in step (ii) to the matrix of aqueous ink, obtained in step (i), to obtain an aqueous ink with fixed color with silver nanoparticles dispersed therein.

In one aspect, the invention relates to an aqueous ink with fixed color obtainable by the process of the invention, said aqueous ink comprising silver nanoparticles and polyvinylpyrrolidone and in particular, alkali metal salt (such as sodium salts), in particular which are as defined in the present disclosure. It may also comprise an alkaline earth metal salt.

The aqueous ink with fixed color of the invention may also comprise classic ink ingredients as described previously, such as solvents, antimicrobial agents, corrosion inhibitors, antifoam agents, rheology modifiers. These ingredients are added to the matrix of aqueous ink in step (i) of the process of the invention.

In one aspect, the invention relates to the use of the aqueous ink, more specifically of an aqueous gel ink, of fixed color as defined above for writing onto an absorbing support. In one embodiment, the absorbing support is a porous substrate, specifically paper, cardboard or textiles.

The present invention also concerns a method of writing with an aqueous ink, more specifically an aqueous gel ink, of fixed color comprising the step of writing on the absorbing support including porous substrates such as paper, cardboard, or textiles, with an aqueous ink with fixed color according to the invention.

After writing onto absorbing support with the aqueous ink, more specifically the aqueous gel ink, of fixed color of the invention, the distance between the silver nanoparticles within the aqueous ink, more specifically the aqueous gel ink, applied on absorbing support is lower than 4 µm, specifically varies from 50 nm to 3 µm, and more specifically varies from 500 to 1 µm.

Finally, the present invention concerns a writing instrument comprising:
- an axial barrel containing the aqueous ink according to the invention, more specifically the aqueous gel ink, and
- a pen body which delivers the aqueous ink stored in the axial barrel.

The writing instrument of the invention may be chosen in the group consisting of gel pens, felt pens, correction fluid, markers, and specifically gel pens.

The invention will be better understood in reference to the example which is given in a non-limited way.

EXAMPLE 1: PREPARATION OF AN AQUEOUS GEL INK WITH FIXED COLOR ACCORDING TO THE PROCESS OF THE PRESENT INVENTION

Preparing a Gel-Based Matrix of Aqueous Ink (Step (i))

In a first step (i), a gel-based matrix of aqueous ink was prepared by mixing 15 g of triethylene glycol (co-solvent), 4 g of polyethylene glycol (co-solvent), 0.19 g of Acticide® MBS (antimicrobial agent), and 0.1 g of Additin® RC8221 (corrosion inhibitor). The mixture was homogenised with a homogenizer mixer at a speed of 15 m·s$^{-1}$ during 15 minutes and heated at a temperature of 35° C. Then, 0.4 g of xanthan gum (rheology modifier) was added to the mixture. The mixture was homogenized with a homogenizing mixer at a speed of 15 m·s$^{-1}$ during 15 minutes at a temperature of 35° C. 80.01 g of deionized water was slowly added to the mixture. The mixture was left to stand for 2 h30. Then, 0.3 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.).

Preparing an Aqueous Suspension of Silver Nanoparticles with Red Color (Step (ii))

In a second step (ii), an aqueous suspension of silver nanoparticles with a fixed color is prepared by mixing 42.527 mL of distilled water, 0.473 mL of a solution of silver nitrate (10 mM) (9370.1 Cark Roth), 3.68 mL of trisodium citrate (30 mM) (S1804-500G Sigma Aldrich), 3.68 mL of polyvinylpyrrolidone 2% (PVP40-100G Sigma Aldrich) and 120 µL hydrogen peroxide 0% (412071 Carlo Erba), 100 µL of sodium borohydride NaBH$_4$ (100 mM)(71321-25G Fluka Analytical).

The mixture was homogenised with a homogenizer mixer at a speed of 400 rpm during 15 to 30 minutes.

Then, 840 µL of AgNO3 (10 mM) are added to the mixture with a homogenizer mixer at a speed of 400 rpm during 10 min.

The mixture is heated at 100° C., then 350 µL of NaBH$_4$ (10 mM) are added. When NaBH$_4$ is added to the mixture, the resulting solution immediately changed from transparent to colored. This color is due to the plasmonic effect.

The mixture is stopped when the expected red color is obtained.

It should be noted that the color of the aqueous suspension of silver nanoparticles depends on the proportion of reducing agent NaBH$_4$. The resulting composition exhibits a plasmonic effect, which means that its color is due to the plasmon effect i.e. due to the light absorption by the nanoparticles dispersion.

For example:

The addition of 200 µL NaBH$_4$ in the mixture described above ensures a pink suspension of silver nanoparticles (test 1)

The addition of 250 µL NaBH$_4$ in the mixture described above ensures a clear purple suspension of silver nanoparticles (test 2).

The addition of 300 µL NaBH$_4$ in the mixture described above ensures a purple suspension of silver nanoparticles (test 3).

The addition of 600 µL NaBH$_4$ in the mixture described above ensures a blue suspension of silver nanoparticles (test 4).

The addition of 970 µL NaBH$_4$ in the mixture described above ensures a red suspension of silver nanoparticles (test 5)

Preparing the Aqueous Gel Ink with Fixed Color (Step (iii))

In a third step (iii), 1 mL of the aqueous suspension of silver nanoparticles obtained in step (ii) is added to 1 mL of the gel-based matrix of aqueous ink obtained in step (i) to obtain an aqueous gel ink with fixed color (red color) with silver nanoparticles dispersed therein and stabilized by 0.07% of polyvinylpyrrolidone.

Test 1: After adding on the gel-based matrix of aqueous ink, the color initially pink appears immediately pink.

Test 2: After adding on the gel-based matrix of aqueous ink, the color initially clear purple appears immediately clear purple.

Test 3: After adding on the gel-based matrix of aqueous ink, the color initially purple appears immediately purple Test 4: After adding on the gel-based matrix of aqueous ink, the color initially blue appears immediately blue Test 5: After adding on the gel-based matrix of aqueous ink, the color initially blue appears immediately red.

Test 1: When the obtained aqueous gel ink with fixed color was written on cellulosic paper, the color appeared immediately pink and did not change after all.

Test 2: When the obtained aqueous gel ink with fixed color was written on cellulosic paper, the color appeared immediately clear purple and did not change after all.

Test 3: When the obtained aqueous gel ink with fixed color was written on cellulosic paper, the color appeared immediately purple and did not change after all.

Test 4: When the obtained aqueous gel ink with fixed color was written on cellulosic paper, the color appeared immediately blue and did not change after all.

Test 5: When the obtained aqueous gel ink with fixed color was written on cellulosic paper, the color appeared immediately red and did not change after all. Furthermore, a visual assessment of the color of this aqueous gel ink was realized over time (tests 1, 2, 3, 4, 5)

As can be seen from Table 1, the color of the aqueous gel ink did not change over time

TABLE 1

Example 1 - Visual assessment of the color of aqueous gel ink (Tests 1, 2, 3, 4, 5) over time

| Time | 0 min | 2 min | 1 hour | 1 day | 1 week |
|---|---|---|---|---|---|
| Test 1 | | | | | |
| Color of the aqueous gel ink before application on cellulosic paper | pink | pink | pink | pink | pink |
| Color of the aqueous gel ink after application on cellulosic paper | Pink | pink | pink | pink | pink |
| Test 2 | | | | | |
| Color of the aqueous gel ink before application on cellulosic paper | Clear purple | Clear purple | Clear purple | Clear purple | Clear purple |
| Color of the aqueous gel ink after application on cellulosic paper | Clear purple | Clear purple | Clear purple | Clear purple | Clear purple |
| Test 3 | | | | | |
| Color of the aqueous gel ink before application on cellulosic paper | Purple | Purple | Purple | Purple | Purple |
| Color of the aqueous gel ink after application on cellulosic paper | Purple | Purple | Purple | Purple | Purple |
| Test 4 | | | | | |
| Color of the aqueous gel ink before application on cellulosic paper | Blue | Blue | Blue | Blue | Blue |
| Color of the aqueous gel ink after application on cellulosic paper | Blue | Blue | Blue | Blue | Blue |
| Test 5 | | | | | |
| Color of the aqueous gel ink before application on cellulosic paper | Red | Red | Red | Red | Red |
| Color of the aqueous gel ink after application on cellulosic paper | Red | Red | Red | Red | Red |

The invention claimed is:

1. A process for preparing an aqueous gel ink with fixed color comprising the following steps:
   (i) preparing a gel-based matrix of aqueous ink;
   (ii) preparing an aqueous suspension of silver nanoparticles with a fixed color by mixing silver salts with:
      water,
      a mixture of at least an alkali metal or alkaline earth metal salt of citrate, and an alkali metal hydride,
      an oxidizing agent, and
      and polyvinylpyrrolidone,
      wherein the silver nanoparticles obtained in step (ii) are silver nanoparticles with the shape of spheres; and
   (iii) adding under agitation the aqueous suspension of silver nanoparticles obtained in step (ii) to the gel-based matrix of aqueous ink obtained in step (i), to obtain an aqueous gel ink with fixed color with silver nanoparticles dispersed therein.

2. The process according to claim 1, wherein the amount of said citrate salts added in step (ii) ranges from 0.001 to 0.08 weight % based on the total weight of the aqueous suspension.

3. The process according to claim 1, wherein the total amount of silver salts added in step (ii) ranges from 0.0005 to 0.006 weight % based on the total weight of the aqueous suspension.

4. The process according to claim 1, wherein the amount of alkali metal hydride added in step (ii) ranges from 0.0005 to 0.005 weight % based on the total weight of the aqueous suspension.

5. The process according to claim 1, wherein the amount of oxidizing agent added in step (ii) ranges from 0.03 to 0.1 weight % based on the total weight of the aqueous suspension.

6. The process according to claim 1, wherein the amount of polyvinylpyrrolidone added in step (ii) ranges from 0.05 to 0.1 weight % based on the total weight of the aqueous suspension.

7. An aqueous suspension of silver nanoparticles with a fixed color obtainable by the process of claim 1, comprising silver nanoparticles and polyvinylpyrrolidone.

8. An aqueous gel ink with fixed color obtainable by the process of claim 1, comprising silver nanoparticles and polyvinylpyrrolidone.

9. The aqueous gel ink according to claim 8, further comprising an alkali metal salt, wherein the amount of alkali metal salt is of at least 0.0003 weight % based on the total weight of the aqueous gel ink.

10. The aqueous gel ink according to claim 8, wherein the silver nanoparticles have an average particle size ranging from 1 to 100 nm.

11. The aqueous gel ink according to claim 8, wherein the amount of silver nanoparticles ranges from 0.0005 to 5 weight % relative to the total weight of the aqueous gel ink.

12. The aqueous gel ink according to claim 8, wherein the amount of water ranges from 50 to 95% by weight relative to the total weight of the aqueous gel ink.

13. The aqueous gel ink according to claim 8, further comprising:
   a co-solvent, in an amount ranging from 5 to 35% by weight relative to the total weight of the aqueous gel ink; and/or
   an antimicrobial agent, in an amount ranging from 0.01 to 0.5% by weight relative to the total weight of the aqueous gel ink; and/or
   a corrosion inhibitor, in an amount ranging from 0.05 to 1% by weight relative to the total weight of the aqueous gel ink; and/or
   an antifoam agent, in an amount ranging from 0.05 to 1% by weight relative to the total weight of the aqueous gel ink; and/or
   a rheology modifier, in an amount ranging from 0.08 to 2% by weight relative to the total weight of the aqueous gel ink.

14. A writing instrument comprising:
   an axial barrel containing an aqueous gel ink with fixed color according to claim 8, and
   a pen body which delivers the aqueous gel ink stored in the axial barrel, wherein the writing instrument is chosen in the group consisting of gel pens, felt pens, correction fluid, and markers.

15. The aqueous suspension according to claim 7, further comprising an alkali metal salt, wherein the amount of alkali metal salt is of at least 0.0003 weight % based on the total weight of the aqueous suspension.

16. The aqueous suspension according to claim 7, wherein the silver nanoparticles have an average particle size ranging from 1 to 100 nm.

17. The aqueous suspension according to claim 7, wherein the amount of silver nanoparticles ranges from 0.0005 to 5 weight % relative to the total weight of the aqueous suspension.

18. The aqueous suspension according to claim 7, wherein the amount of water ranges from 50 to 95% by weight relative to the total weight of the aqueous suspension.

19. The aqueous gel ink according to claim 9, wherein the silver nanoparticles have an average particle size ranging from 1 to 100 nm.

\* \* \* \* \*